(12) United States Patent
Reiling

(10) Patent No.: US 6,911,504 B2
(45) Date of Patent: Jun. 28, 2005

(54) APPARATUS AND PROCESS FOR GAS PHASE FLUIDIZED-BED POLYMERIZATION

(75) Inventor: Vincent Reiling, Vauvenargues (FR)

(73) Assignee: BP Chemicals Limited, London (GB)

( * ) Notice: Subject to any disclaimer, the term of this patent is extended or adjusted under 35 U.S.C. 154(b) by 120 days.

(21) Appl. No.: 10/257,357

(22) PCT Filed: Apr. 12, 2001

(86) PCT No.: PCT/GB01/01727
§ 371 (c)(1),
(2), (4) Date: Mar. 27, 2003

(87) PCT Pub. No.: WO01/79306
PCT Pub. Date: Oct. 25, 2001

(65) Prior Publication Data
US 2003/0162914 A1 Aug. 28, 2003

(30) Foreign Application Priority Data
Apr. 13, 2000 (FR) .............................. 00 04757

(51) Int. Cl.$^7$ .................................................. C08F 2/34
(52) U.S. Cl. ........................... 526/68; 526/67; 526/901; 422/132; 422/147
(58) Field of Search ........................... 526/67, 68, 901; 422/132, 147

(56) References Cited

U.S. PATENT DOCUMENTS 3,922,322 A * 11/1975 Roger et al. ................ 525/54
4,716,856 A   1/1988 Beisswenger et al.
5,421,842 A   6/1995 Shabaker et al.
5,698,642 A * 12/1997 Govoni et al. ............... 526/65

FOREIGN PATENT DOCUMENTS

| EP | 0 844 022 A2 | 5/1998 |
| FR | 2 137 441 | 12/1972 |
| FR | 2 207 145 | 6/1974 |
| FR | 2 618 786 | 2/1989 |
| WO | WO 97/04015 | 2/1997 |
| WO | WO 97/14721 | 4/1997 |

* cited by examiner

Primary Examiner—Fred Teskin
(74) Attorney, Agent, or Firm—Finnegan, Henderson, Farabow, Garrett and Dunner, L.L.P.

(57) ABSTRACT

A process for the continuous gas-phase (co)polymerization of one or more olefins for which a rising stream of a gas mixture, comprising at least one olefin to be (co) polymerized, maintains polymer particles in the course of formation in the fluidized state in a polymerization reactor, the said stream entraining fine particles above the fluidized bed outside the reactor, the said fine particles being substantially separated from the gas mixture using a separator, thus dividing the said stream into (i) one or more gas streams (A) substantially devoid of solid particles which is cooled and reintroduced below and/or into the bottom part of the fluidized bed, and (ii) one or more gas streams (B) comprising at least a portion of the said particles which is introduced into or above the fluidized bed, which process is characterized in that at least one of the gas streams (B) comprising the solid particles is introduced directly into the fluidized bed by a dilute-phase transport in a simple pipe, that is to say preferably without using equipment for setting in motion.

17 Claims, 3 Drawing Sheets

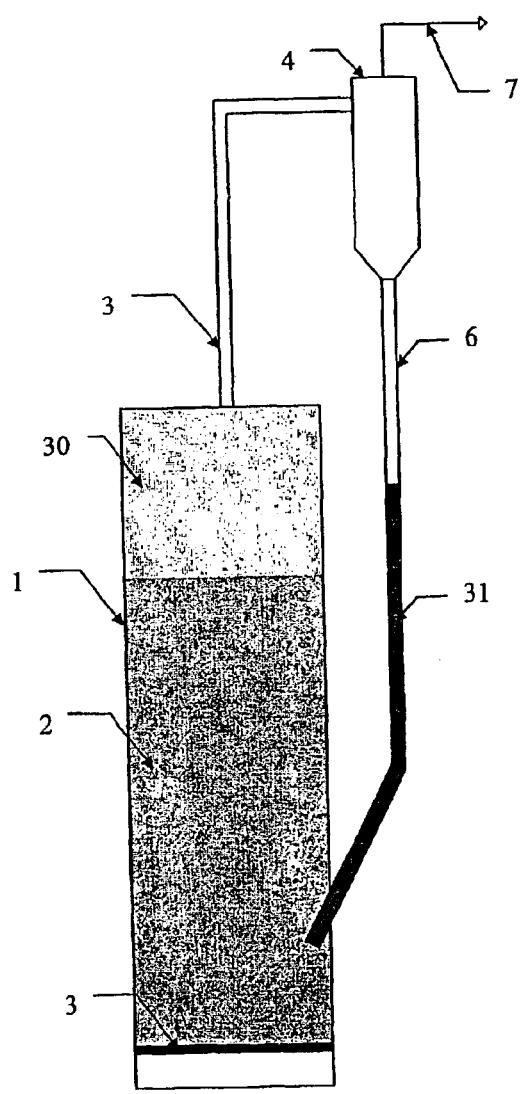
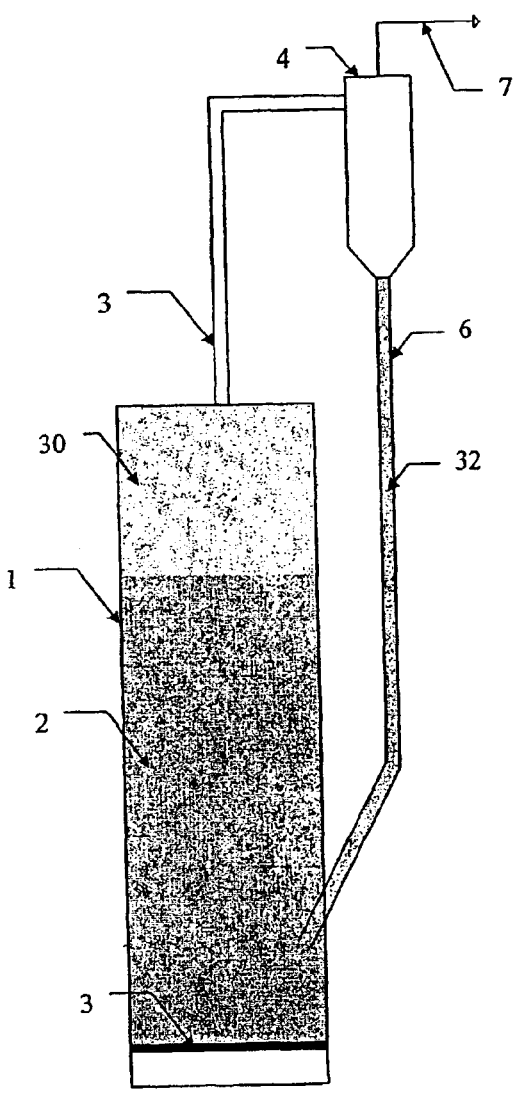

APPARATUS AND PROCESS FOR GAS PHASE FLUIDIZED-BED POLYMERIZATION

BACKGROUND OF THE INVENTION

The field of the present invention is the manufacture of a polymer in a gas-phase and fluidized-bed reactor.

The main problems in gas-phase and fluidized-bed polymerization processes are often related to the entrainment outside the fluidized bed of fine particles of the polymer in the course of formation. This phenomenon, when it is poorly controlled, is often the source of numerous problems, such as the fouling, or even the blocking of the pipes and various devices. Numerous efforts have thus been directed at the use of means which seek to eliminate or to reduce these problems related to the entrainment of particles outside the bed.

A solution which has been known for a long time consists in widening the transverse cross section in the upper part of the reactor in order to reduce the velocity of the gas stream above the fluidized bed and thus to promote the sedimentation of the entrained solid particles. The most widely known means is to use a cylindrical reactor surmounted by a disengagement chamber with a greater transverse cross section. However, this solution is not very economical and does not make it possible to completely eliminate the entrainment of solid particles.

Generally, all the means which promote the sedimentation of particles entrained above the fluidized bed are insufficient and do not completely eliminate the problem of the entrainment of particles and in particular of fine particles.

To at least partially solve the problems relating to the entrainment of the particles, it is necessary to use other techniques in parallel with the above-mentioned solutions, such as separation techniques using, for example, dust separators, such as cyclones.

In the majority of cases, the separators used are combined with one or more injection devices which make it possible, by virtue of suction by the Venturi effect generated using a carrier gas, to introduce the separated particles into the polymerization reactor. French Patent FR 2,618,786 discloses a gas-phase and fluidized-bed polymerization process for which the fine particles entrained by the gas stream above the fluidized bed are separated and are brought into contact with a carrier gas in a mixing device and are reintroduced as a mixture with this gas into the reactor above the fluidized bed. The said mixing device corresponds to the description of the above device, which is generally known under the name of ejector or of ejector/compressor. The use of such a device in a polymerization process presents a risk related to its fouling by the polymer particles. Furthermore, this type of device is often limited in terms of throughput of solid particles and may generally only be viable if the entrainment is already reduced by a widening of the effective transverse cross section above the fluidized bed. Furthermore, the experience has shown that an acceleration of the fine particles to a higher velocity before reintroduction info the reactor is not viable because it is a major contributor to static build-up in the reactor bed.

French Patent Application FR 2,137,441 also discloses the use of an ejector as described above but the solid particles are reintroduced directly into the fluidized layer. This improvement with respect to the preceding patent does not, however, eliminate the problems mentioned above which are related, inter alia, to the fouling and to the blocking of the said ejectors.

European Patent EP 0,381,364 discloses a fluidized-bed reactor comprising a vertical cylinder for which a dust separator is connected to the reactor via a pipe for recycling the fine particles, this pipe emerging in the upper half of the cylinder. The claims refer to a figure clearly exhibiting the use of an ejector, that is to say of a device for mixing between the separated particles and a carrier gas, as described above.

The separators used can be combined with diplegs inside the fluidized bed. This type of device makes it possible to inject the separated particles into the fluidized bed. This technique is commonly used in steam cracking processes of FCC type for the circulation of the catalyst particles. This is characterized by a dense-phase transport in a tubular pipe of the solid particles as far as the inside of the fluidized bed, the said tubular pipe generally being inclined at its end. The main advantage of this device is related to its simplicity of use. Once again, this device is difficult to apply to a polymerization process because of the risks of fouling, or even blocking, due to the dense phase in the transport of active solid particles.

There exists a need for a person skilled in the art to discover a technique for recycling the solid particles entrained above a fluidized bed which makes it possible to solve the abovementioned problems.

SUMMARY OF THE INVENTION

An unexpected method of use of the diplegs for the recycling of the fine polymer particles in a gas-phase and fluidized-bed reactor has been found which allows a sufficient throughput of particles to dispense with the disengagement region generally needed in order to handle the entrained fines.

It is entirely surprising that the process described below is effective, as its use has never previously been envisaged because of the risks of blockage, due to the density of the flow phase, of the ruinous residence times and, in particular, of the activity of the particles in a polymerizing atmosphere.

The present invention is a process for the continuous gas-phase (co)polymerization of one or more olefins for which a rising stream of a gas mixture, comprising at least one olefin to be (co)polymerized, maintains polymer particles in the course of formation in the fluidized state in a polymerization reactor, the said stream entraining fine particles above the fluidized bed outside the reactor, the said fine particles being substantially separated from the gas mixture using a separator, thus dividing the said stream into (i) one or more gas streams (A) substantially devoid of solid particles which is cooled and reintroduced below and/or into the bottom part of the fluidized bed, and (ii) one or more gas streams (B) comprising at least a portion of the said particles which is introduced into or above the fluidized bed, which process is characterized in that at least one of the gas streams (B) comprising the solid particles is introduced directly into the fluidized bed by a dilute-phase transport in a simple pipe, that is to say preferably without using equipment for setting in motion.

BRIEF DESCRIPTION OF THE DRAWINGS

FIG. 3.a diagrammatically represents a device with operating conditions which do not reflect the process of the present invention.

FIG. 3.*b* represents the same device as FIG. 3.*a* but with operating conditions which reflect the process of the present invention.

DETAILED DESCRIPTION OF THE INVENTION

Figure 1:
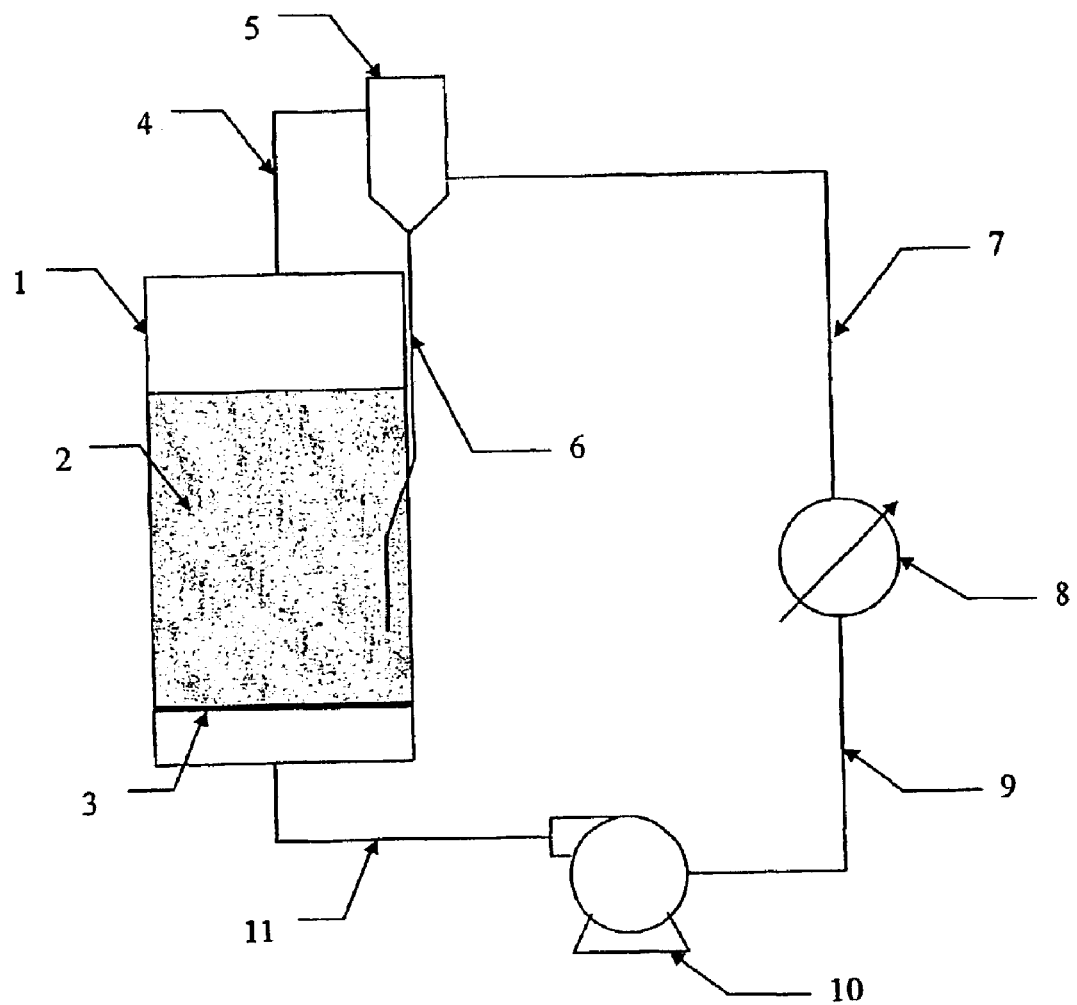
FIG. 1 diagrammatically represents a device capable of being employed according to the process of the present invention.

A subject-matter of the invention is thus a process for the continuous gas-phase (co)polymerization of one or more olefins. The olefins can preferably be chosen from (a) ethylene, (b) propylene, (c) their mixture, and one or more other alpha-olefins in combination with (a), (b) or (c). The gas phase can comprise the olefins, hydrogen and a neutral gas, such as nitrogen.

The process of the invention is also suitable for the manufacture of other types of polymers, such as:
butadiene-styrene rubber (polymer based on butadiene copolymerized with styrene),
ABS (polymer based on acryonitrile, butadiene and styrene), nitrile rubber polymer based on butadiene copolymerized with acryonitrile),
butyl rubber (polymer based on isobutylene copolymerized with isoprene),
EPR (polymer based on ethylene with propylene),
EPDM (polymer based on ethylene copolymerized with propylene and a diene, such as hexadiene, dicyclopentadienyl or ethylidenenorbornene),
copolymers of ethylene and vinyltrimethoxysilane,
copolymers of ethylene and one or more of the components chosen from acryonitrile, maleic acid ester, vinyl acetate, acrylic acid ester and methacrylic acid ester.

The continuous polymerization is preferably carried out in a vertical fluidized-bed reactor in accordance with what is disclosed in Patent (Applications) EP-0,855,411, FR No. 2,207,145 or FR No. 2,335,526. The process according to the present invention thus applies in particular to industrial-sized plants, namely, by way of example, to fluidized-bed polymerization reactors with an annual production of polymer of at least one hundred thousand tonnes, preferably at least two hundred thousand tonnes.

The process also comprises the introduction into the polymerizing medium of a catalyst and optionally of a cocatalyst, and the withdrawal of the (co)polymer manufactured, it being possible for these two functions to be carried out continuously or batchwise.

The (co)polymerization can be carried out using a catalyst comprising at least one transition metal which can be, for example, a Ziegler-Natta catalyst, optionally in combination with a cocatalyst comprising an organometallic compound, for example in combination with an organoaluminium compound. The catalyst can essentially comprise an atom of a transition metal chosen from the metals from Groups IV to VI of the Periodic Classification of the Elements, such as titanium, vanadium, chromium, zirconium or hafnium, optionally a magnesium atom and a halogen atom. It is also possible to use a Ziegler-Natta catalyst of metallocene type. The catalyst can be supported on a porous refractory oxide, such as silica or alumina, or be combined with a solid magnesium compound, such as magnesium chloride, oxide or hydroxychloride or a magnesium alkoxide. It is also possible to use a catalyst complexed with iron and/or cobalt, such as, for example, those disclosed in Patent Application WO 98/27124, WO99/12981 or WO 98/2638. It is also possible to use a catalyst composed essentially of a chromium oxide activated by heat treatment and combined with a granular support based on a refractory oxide.

The catalyst can be used in the form of a prepolymer powder prepared in advance during a prepolymerization stage from the catalysts described above. The prepolymerization can be carried out by any process, for example a prepolymerization in a liquid hydrocarbon or in a gas phase, according to a continuous or batchwise process.

The polymerization reactor is maintained at a temperature below the melting point of the (co)polymer, for example at a value of between 30 and 130° C., preferably between 50 and 120° C., in particular between 60 and 110° C., and at a pressure of, for example, between 0.1 and 5 MPa, preferably between 0.5 and 4 MPa, in particular between 1 and 3 MPa.

The (co)polymer manufactured can be any polymer, such as a high density polymer, HDPE, low density polymer, LDPE, or linear low density polymer, LLDPE. The density of the (co)polymers manufactured can be between 0.850 and 0.980 g/cm$^3$, preferably between 0.920 and 0.965 g/cm$^3$, if it is an HDPE, or else between 0.910 and 0.950 g/cm$^3$, preferably between 0.913 and 0.925 g/cm$^3$, if it is an LDPE or an LLDPE.

The densities can be measured according to ISO Standard 1183-87 and ASTM Standard D2839-87. The melt flow index of the (co)polymers manufactured can be between 0.1 and 200 g/10 min, preferably between 0.5 and 100 g/10 min. The melt flow indices can be measured according to the Standard ASTM-D-1238, Condition E). The (co)polymer particles manufactured have a size distribution which can vary between the minimum measurable and 2000 μm, preferably between 1 and 1000 μm, for example between 45 and 800 μm. The size distribution of the particles can be measured, for example, by virtue of a device of Malvern© type.

According to the present invention, a rising stream of a gas mixture comprising at least one olefin to be (co) polymerized maintains polymer particles in the course of formation in the fluidized state. The gas mixture thus comprises at least one olefin to be (co)polymerized. It can also advantageously comprise hydrogen, an inert gas, such as, for example, nitrogen, and optionally a hydrocarbon, such as, for example, ethane, propane, butane, pentane and hexane. The term "polymer particle in the course of formation" is understood to mean any solid particle in the fluidized bed. It relates not only to polymer particles having different progresses but also to catalyst or prepolymer particles. The velocity of the gas mixture which makes it possible to maintain the polymer particles in the course of formation in the fluidized state, generally known as the fluidization velocity, is generally greater than (several multiples of) the minimum fluidization velocity. The gas mixture is distributed over the entire cross section of the polymerization reactor by virtue of a distribution grid. The fluidization velocity of the gas mixture can be between 0.2 and 1 m/s, preferably between 0.4 and 0.9 m/s, in particular between 0.6 and 0.8 m/s. The portion of the reactor where the particles are maintained in the fluidized state is often known as the fluidized bed. The ratio H/D between the height H and diameter D of the fluidized bed can vary between 1 and 10, preferably between 2 and 4.

According to the present invention, the fine particles are substantially separated from the gas mixture. The term "fine particles" is understood to mean any polymer particle in the course of formation which is entrained above the fluidized bed and more particularly outside the polymerization reactor. These fine particles have dimensions which can vary according to various parameters, such as, for example, the morphology, the density or the bonding ability of the said particles, the fluidization velocity, the density of the gas phase, the height of the reactor above the fluidized bed, the shape of the said reactor, the formation of particle clusters and the like. The fine particles as have been defined above can have any size, which can range up to the maximum size of the particles in the course of formation. The fine particles entrained outside the reactor can be separated from the gas mixture by any means, for example using filters or cyclones, preferably one or more cyclones.

According to the present invention, the gas stream which entrains the fine particles is separated into (i) one or more gas streams (A) substantially devoid of solid particles which is cooled and reintroduced below and/or into the bottom part of the fluidized bed and (ii) one or more gas streams (B) comprising at least a portion of the said particles which are introduced into or above the fluidized bed. The term "gas stream streams (A) substantially devoid of fine particles" within the meaning of the present invention is preferably understood to mean that the ratio by mass of the solid particles of the gas stream or streams (A) to those of the gas stream or streams (B) is less than 1, preferably less than 0.1, in particular less than 0.01.

According to a specific form of the present invention, the gas stream (A) can be at least partially cooled to a temperature such that a liquid is condensed, which liquid is reintroduced as a mixture with the gas into the reactor, such as disclosed in Patents EP 0,089,691 and EP 0,773,963. The condensed liquid can alternatively be separated and introduced inside the reactor, such as disclosed in Patent Application WO 94/28032.

According to the present invention, the gas stream (B) comprising the solid particles is introduced into or above the fluidized bed by a dilute-phase transport in a simple pipe, preferably without using equipment for setting in motion.

The gas stream (B) can be introduced anywhere into or above the fluidized bed, generally above the region for formation of the gas jets of the distribution grid.

However, it is preferable to introduce the gas stream (B) into the lower part of the fluidized bed at a height above the distribution grid of between 20 cm and H/2, in particular between 40 cm and H/4, H being the height of the fluidized bed.

The gas stream (B) is introduced into or above the fluidized bed by using a simple pipe which can be substantially vertical or inclined. The inclination with respect to the vertical of the simple pipe can be between 90° and 0°, preferably between 45° and 0°, in particular between 15° and 0°. The simple pipe can preferably have a tubular shape.

The gas stream (B) comprising the solid particles is preferably introduced into or above the fluidized bed without using equipment for setting in motion. The term "equipment for setting in motion" is understood to mean any equipment which makes it possible to transport the solid particles from the base of the separator to the fluidized bed reactor. Mention may be made, by way of example, of equipment using a Venturi effect for accelerating the said solid particles. This is the case, for example, with ejector/compressors.

The gas stream (B) is introduced directly into or above the fluidized bed by a dilute-phase transport. The phrase "a dilute-phase transport" is understood to mean a homogeneous-phase transport, often known as "streaming flow". According to a preferred embodiment of the present invention, said "dilute-phase transport" or "streaming flow" can be characterized by its apparent density, AD. Preferably, when the transport of the gas stream (B) is a dilute-phase transport, the apparent density of the latter, AD, can be between 0.4×ADf and ADp, preferably 0.8×ADf and ADp, ADf being the apparent density of the fluidized bed and ADp that of the (co)polymer manufactured. The said apparent density AD of the dilute transport is preferably between ADf and ADp, in particular between ADf and (ADp+ADf)/2. Any appropriate density measurement can be used according to the present invention in order to determine AD, ADf and ADp.

The apparent density of the fluidized bed, ADf, or of the dilute-phase transport, AD, can be calculated for a given height from a differential pressure measurement. The apparent density of the fluidized bed, ADf, is equal to the ratio of the differential pressure to the product of the normal acceleration of gravity at the surface of the earth and the height over which the differential pressure is measured. The pressure measurement can be carried out by any appropriate means.

The apparent density of the (co)polymer can be measured by weighing a known volume of polymer according to an empirical method. The equipment used for this measurement is composed of a balance accurate to plus or minus 0.1 gram and of a metal funnel, polished on the inside, which has a given shape and is equipped at its lower end with a closing device. The funnel is attached at a height of 25+/−5 mm from a cylindrical measuring container of 100+/−0.5 cm$^3$ with an internal diameter of 50 mm. The measuring procedure consists in carrying out the following actions: weighing the measuring container, closing the closing device of the funnel, filling the funnel with polymer, opening the closing device, allowing the powder to flow into the measuring container, passing a straight scraper over the top of the measuring container in order to remove the excess material and weighing the container full of polymer. The apparent density of the polymer is subsequently calculated and corresponds to the ratio of the difference between the weight of the full measuring container and the weight of this same empty container to the volume of this same container.

The nature of the transport of the gas stream (B) in the simple pipe can also be determined by measuring the pressure profile along the said pipe. A continuous and virtually linear pressure profile characterizes, in the majority of cases, a dilute-phase transport or flow. A dense-phase transport or flow can generally be characterized by a non-continuous profile along the pipe, reflecting the presence of a slug of (co)polymer accumulated in the said pipe.

In order to obtain a dilute-phase transport of the gas stream (13), the throughput by mass of the solid particles must be sufficient to counteract the driving force generated by the difference in pressure between the ends of the simple pipe of the gas stream (B). The throughput by mass of the solid particles of the gas stream (B) can vary according to a number of parameters related to the entrainment of fine particles above the fluidized bed, such as, for example, the height of the fluidized bed, the particle size distribution and the fluidization velocity.

In order to obtain a dilute-phase transport of the gas stream (B), it may be necessary to pass through a transitory phase during which the transport of the gas stream (B) is in the dense phase, that is to say with an apparent density AD which can be substantially equal to the apparent density of the (co)polymer at rest, ADp. During this transitory phase, the height of the slug of (co)polymer accumulated in the simple pipe is generally sufficient to counteract the driving force generated by the excess pressure of the fluidized bed with respect to the pressure of the gas stream (B). In order subsequently to obtain a dilute-phase transport according to the present invention, it may be sufficient to increase the throughput by mass of the solid particles of the gas stream (B), for example by increasing the fluidization velocity. This can make it possible to increase the height of the slug of (co)polymer accumulated up to a collapse limit, beyond which the throughput of the solid particles is sufficient to counteract the driving force mentioned above.

A transitory phase during which the transport of the gas stream (B) is in the dense phase is preferably passed through when the polymerization conditions are not fulfilled, such as, for example, before the beginning of the injections of the catalyst or of the prepolymer.

According to a specific form of the present invention, two cyclones in series can be used, the first making possible a rough separation of the fine particles and the second making possible a more refined separation. The first fraction of fine particles generated by the first cyclone can constitute a gas stream (B) introduced directly into the bottom part of the fluidized bed by a dilute-phase transport in a simple pipe. The second fraction of fine particles generated by the second cyclone can constitute a second gas stream (B) introduced into the polymerization reactor by any appropriate means.

The invention also relates to a device for carrying out the process. This device essentially comprises:

(i) a fluidized-bed polymerization reactor comprising a cylindrical cross section and a distribution grid,
(ii) at least one separator of fine particles connected to the upper part of the polymerization reactor,
(iii) a loop for recycling the gas of the gas mixture connecting the or at least one of the separators of fine particles to the base of the reactor, this loop comprising a heat exchanger and a gas compressor, and
(iv) at least one or several arrangements for introducing solid particles into the reactor connecting the separators of fine particles to the polymerization reactor, the device being characterized in that at least one of the arrangements for introducing solid particles into the reactor is a simple pipe emerging inside the polymerization reactor in the fluidized bed.

According to an advantageous form of the present invention, the polymerization reactor does not comprise a disengagement region. The polymerization reactor can preferably be essentially cylindrical.

According to a specific form of the present invention, the reactor is surmounted by an acceleration region, such as a restriction having, for example, a conical shape. According to this specific form, the entrainment of the fine particles above the fluidized bed is increased, which makes it possible to increase the throughput by mass of the solid particles of the gas stream (B) in order to promote the change to the dilute-phase transport of the said gas stream (B), that is to say according to the process of the present invention.

One advantage of the present invention is to transform the disadvantages related to the entrainment of fine particles above the fluidized bed, in particular outside the polymerization reactor, into advantages which make it possible to use high fluidization velocities and/or a greater height for the fluidized bed.

Another considerable advantage of the present invention is to reduce the cost of constructing the polymerization reactor, due to the absence of a disengagement region in its preferred embodiment.

Another advantage of the present invention is to have a more uniform particle size distribution in the fluidized bed due to a more uniform distribution of the fine solid particles in the fluidized bed and also to a reduced segregation of the said fine particles if the reactor does not have a disengagement region.

Another advantage of the present invention is to make possible circulation of fine particles such that the said fine particles have a size distribution similar to or even identical to that of the solid particles in the fluidized bed. This makes it possible to limit the risks related to the accumulation of smaller particles, which can be more active.

Another advantage of the present invention is that the pressure drop in the cyclone is reduced because of a greater load of solid particles at the inlet of the said cyclone.

For a cyclone used according to the prior art in a gas-phase polymerization process, the solid load at the inlet of the cyclone is relatively low, much less than 1 kg of solid per 1 $m^3$ of gas. According to the operating conditions of the prior art, an increase in the load at the inlet of the cyclone results in an increase in the pressure drop across the said cyclone.

During the implementation of the present invention, that is to say with a solid load at the inlet of the cyclones which is much higher than in the prior art, it was observed with surprise that an increase in the solid load tends to reduce the pressure drop across the cyclone. This unexpected observation proves to be highly advantageous and beneficial. Thus it is possible to use the cyclones more efficiently and economically.

Another advantage of the present invention is that the apparent density of the powder in the simple pipe connecting the cyclone to the reactor is greater when the disengagement region of the reactor is removed because the size distribution of the entrained solid particles is closer to that of the fluidized bed.

Another advantage of the present invention is that the introduction of the fine solid particles into the reactor takes place with a velocity lower than that induced by a device for setting in motion, such as an ejector or an ejector/compressor. As already said, this has the unexpected advantage of considerably reducing the static electricity generated by the fine particles inside the reactor and, consequently, of reducing the risks of fouling and/or sheeting.

Another advantage of the present invention is related to the low risk of accumulation of fine particles on the inclined walls of the disengagement region due to the possible advantageous removal of the latter. Indeed, the accumulation of fines on the inclined wall of the disengagement section is a well known problem which leads to sheeting.

FIG. 1 diagrammatically represents a device which can be employed according to the process of the present invention. The device represented comprises a fluidized-bed (2) polymerization reactor (1) which comprises, in its lower part, a distribution grid (3) and which has an upper part connected to a separator (5) via a pipe (4) in which the fine particles are entrained. The separator (5) is connected to two discharge pipes (6) and (7). The discharge pipe (6) is a simple pipe, generally tubular, which emerges inside the polymerization reactor (1) in the fluidized bed (2). The discharge pipe (7) is connected to a heat exchanger (8). The latter is connected via a pipe (9) to a compressor (10) connected via a feed pipe (11) to the base of the polymerization reactor (1).

Figure 2:
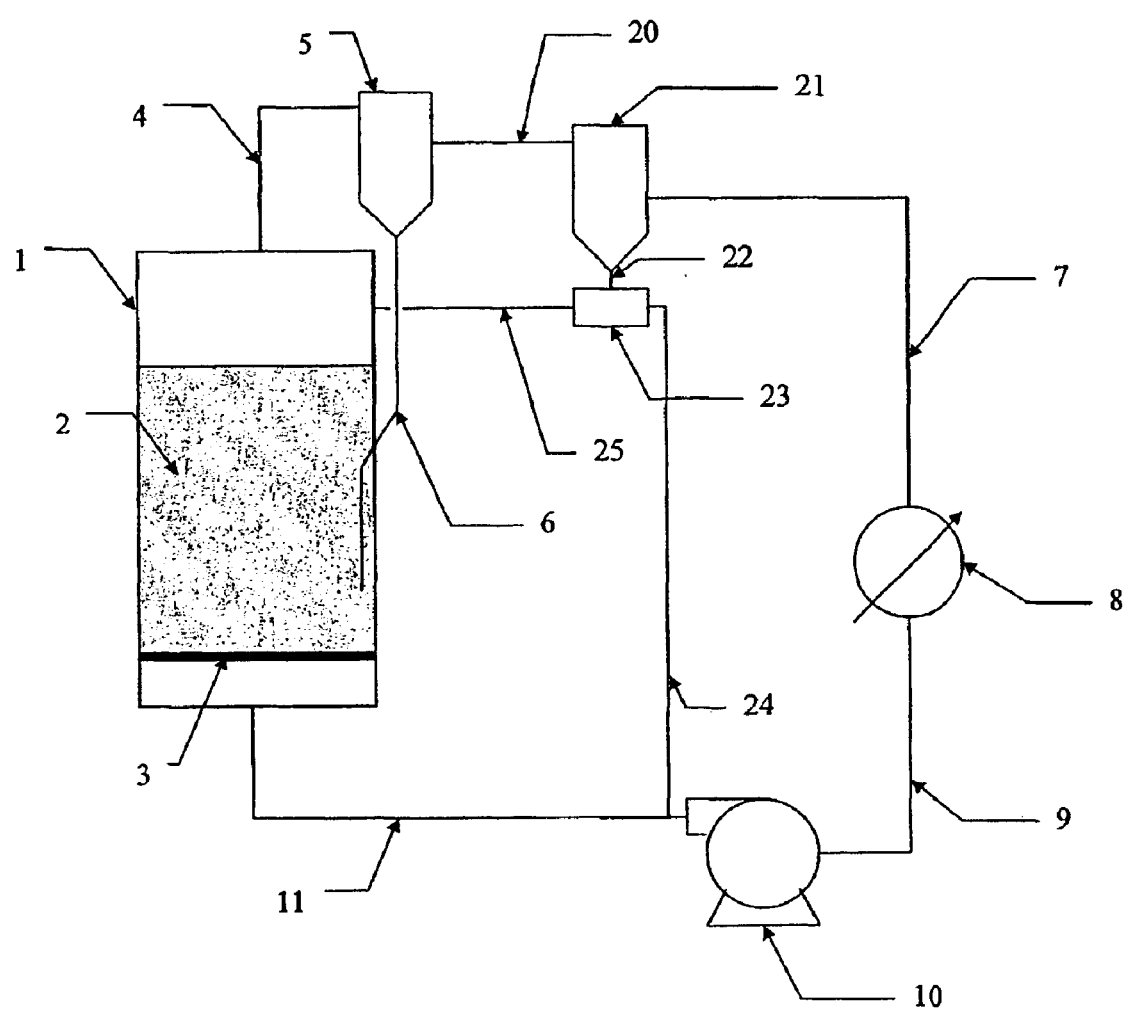
FIG. 2 diagrammatically represents another device according to the process of the present invention.

FIG. 2 diagrammatically represents another device according to the process of the present invention. This figure comprises components already described in FIG. 1. The separator (5) is combined with a second separator (21) connected to the first via a pipe (20). The second separator (21) is connected to two discharge pipes (22) and (7). The pipe (22) is connected to an ejector/compressor (23) of the same type as that disclosed in French Patent FR 2,618,786. This ejector/compressor is connected, on one side, to a supply of high pressure gas by virtue of a pipe (24) and, on the other side, to a pipe (25) for discharge of the fine particles into the polymerization reactor (1).

The two FIGS. 3.a and 3.b comprise components already described in FIGS. 1 and 2.

FIG. 3.a diagrammatically represents a device with operating conditions not reflecting the process of the present invention. This figure represents the case of a dense-phase transport of the gas stream (B). The entrainment of fine particles above the fluidized bed (30) is not sufficient to allow a dilute-phase transport. The transport of the gas stream (B) is not homogeneous and is characterized by the presence of a slug of (co)polymer (31) in the pipe (6), the height of which makes it possible to counteract the driving force generated by the excess pressure of the fluidized bed (2) with respect to the pressure of the gas stream (B). In this case, the apparent density of the slug of powder and the residence time of the solid particles in the pipe (6) are too high and can result in the said pipe becoming plugged.

FIG. 3.b represents the same device as FIG. 3.a but with operating conditions reflecting the process of the present invention. In the present case, the transport of the gas stream (B) is in the dilute phase. The entrainment of fine particles above the fluidized bed (30) is sufficient to allow a dilute-phase transport (32) in the simple pipe (6). In this case, the apparent density in the pipe (6) and the residence times of the solid particles of the gas stream (B) in the said pipe are sufficiently low to significantly decrease the risks of plugging the said pipe.

EXAMPLES C1, C2, C3, C4, C5, C6, C7 AND C8

This series of examples is based on the modelling of the entrainment of fine solid particles above the fluidized bed and on the calculation of operating conditions of a cyclone and of an ejector/compressor.

The device under consideration corresponds to an industrial device for the gas-phase and fluidized-bed manufacture of polyethylene comprising:
- a fluidized bed reactor with a cylindrical main section which has a diameter, Dr, of 5 m and a height, Hr, of 20 m, the section being surmounted, in Examples C1, C2, C3 and C4 alone, by a disengagement region with a maximum diameter of 8.66 m and the reactor being equipped at its base with a distribution grid,
- two parallel cyclones, the dimensions of which are given in the CYC1 column of Table 1,
- two ejector/compressors, which make it possible to introduce the fine separated solid particles into the reactor, and
- two cylindrical pipes connecting the bases of the cyclones to the reactor with a diameter of 0.010 m.

TABLE 1

|  | CYC 1 | CYC 2 | CYC 3 |
|---|---|---|---|
| Feed orifice for the cyclone | tangential | tangential | tangential |
| Diameter of the main section (m) | 1.7 | 2.25 | 0.168 |
| Velocity at the feed orifice of the cyclone (m/s) | 25 | 11 | 10 |
| Width of the feed orifice (m) | 0.34 | 0.45 | 0.02 |
| Height of the feed orifice (m) | 0.85 | 1.6 | 0.152 |
| Diameter of the orifice for discharge of the particles (m) | 0.85 | 0.65 | 0.108 |
| Height of the insert for discharge of the gas (m) | 1.063 | 1.4 | 0.076 |
| Height of the cyclone (m) | 6.8 | 11.25 | 0.74 |
| Height of the cylindrical part (m) | 3.4 | 3.4 | 0.55 |

The characteristics of the polyethylene powder used are given in the PE1 column in Table 2.

TABLE 2

|  | PE1 | PE2 |
|---|---|---|
| Density of the particles ρp (kg/m$^3$) | 870 | 910 |
| Density of the polymer ρs (helium skeleton density) (kg/m$^3$) | 954.9 | 912 |
| Apparent density (kg/m$^3$) (ADp) | 420 | 430 |
| Shape factor φ | 0.46 | 0.84 |
| Mean diameter of the particles of the fluidized bed (μm) | 1130 | 817 |
| % of fine particles of less than 125 μm | 2.92 | 0.28 |

The operating conditions are as follows:

Reactor pressure: 2.4 MPa

Density of the gas in the reactor: 25.5 kg/m$^3$

Viscosity of the gas in the reactor: 0.014 cP

Height of the fluidized bed: 20 m

Available TDH: 8.5 m

The operating conditions for various values of fluidization velocity, with or without a disengagement region above the main section of the reactor, are presented in Table 3.

TABLE 3

|  | C1 | C2 | C3 | C4 | C5 | C6 | C7 | C8 |
|---|---|---|---|---|---|---|---|---|
| Disengagement region (with/without) | with | with | with | with | without | without | without | without |
| Fluidization velocity (m/sec) | 0.3 | 0.4 | 0.6 | 0.8 | 0.25 | 0.30 | 0.4 | 0.6 |
| TDH theoretically required (m) | 3.44 | 4.66 | 6.09 | 6.66 | 6.55 | 6.86 | 7.41 | 8.46 |
| % of the fluidized bed entrained (% by mass) | 3 | 5 | 13 | 24 | 20 | 31 | 53 | 85 |
| Mean diameter of the entrained particles (μm) | 22.8 | 30.5 | 51 | 78 | 73.3 | 90.6 | 139 | 258 |
| Apparent density of the fluidized bed (kg/m$^3$) | 378 | 363 | 335 | 311 | 387 | 378 | 362 | 335 |
| dP gas across the cyclones (MPa) | 5.4 | 9.8 | 22.5 | 40.4 | 3.7 | 5.4 | 9.8 | 22.5 |
| dP gas + solid across the cyclones (MPa) | 4.3 | 6.8 | 13.2 | 21.0 | 2.2 | 3.0 | 4.9 | 9.7 |
| Gas throughput across the cyclones (m$^3$/min) | 177 | 236 | 353 | 471 | 147 | 177 | 236 | 353 |

TABLE 3-continued

|  | C1 | C2 | C3 | C4 | C5 | C6 | C7 | C8 |
|---|---|---|---|---|---|---|---|---|
| Powder throughput at the inlet of the ejectors (kg/hr) | 54 | 220 | 1165 | 4154 | 992 | 2063 | 6735 | 33,318 |
| Velocity of the particles between the cyclones and the reactor (m/s) | 10–20 | 10–20 | 10–20 | NA | 10–20 | 10–20 | NA | NA |
| Blocking of the ejectors (yes/no) | no | no | no | yes | no | no | yes | yes |

Note:
NA = Not Applicable

The results presented in Table 3 show that, for a powder throughput at the inlet of the ejectors above a certain limit (in particular between 2063 and 4154 kg/hr), the ejectors are no longer operational and become blocked. In the case of a conventional reactor (with a disengagement region), the fluidization velocity above which the ejectors are no longer operational is between 0.6 and 0.8 m/s. In the absence of a disengagement region, the blocking of the ejectors takes place for a fluidization velocity above a lower limit of 0.25 to 0.30 m/s. The operation of the ejectors for higher fluidization velocities would require an uneconomical amount of carrier gas, which would render the process not very economical.

The device under consideration corresponds to the same industrial device for the manufacture of polyethylene as for the preceding series of examples, with the exception of the ejectors, which are replaced by simple tubular pipes with a diameter equal to 0.020 m which emerge at a height with respect to the distribution grid which is equal to 15 m.

The aim of this series of examples is to characterize the various types of flows in the simple pipes between the cyclones and the reactor.

The operating conditions for various values of fluidization velocity, with or without a disengagement region above the main section of the reactor, are presented in Table 4.

TABLE 4

|  | C9 | C10 | C11 | 12 | C13 | 14 | 15 | 16 |
|---|---|---|---|---|---|---|---|---|
| Disengagement region (with/without) | with | with | with | with | without | without | without | without |
| Fluidization velocity (m/sec) | 0.6 | 0.8 | 0.9 | 1 | 0.3 | 0.4 | 0.6 | 0.8 |
| TDH theoretically required (m) | 6.09 | 6.66 | 6.86 | 7.05 | 6.86 | 7.41 | 8.46 | 9.72 |
| % of the fluidized bed entrained (% by mass) | 13 | 24 | 31 | 38 | 31 | 53 | 85 | ≧85 |
| Mean diameter of the entrained particles ($\mu$m) | 51 | 78 | 90.6 | 111 | 90.6 | 139 | 258 | 380 |
| Apparent density of the fluidized bed (kg/m$^3$) | 335 | 311 | 300 | 290 | 378 | 362 | 335 | 311 |
| dP gas across the cyclones (MPa) | 22.5 | 40.4 | 55.1 | 63.6 | 5.4 | 9.8 | 22.5 | 40.4 |
| dP gas + solid across the cyclones (MPa) | 13.2 | 21.0 | 25.7 | 30.4 | 3.0 | 4.9 | 9.7 | 16.8 |
| Gas throughput across the cyclones (m$^3$/sec) | 353 | 471 | 530 | 589 | 177 | 236 | 353 | 471 |
| Powder throughput in the simple pipes (kg/hr) | 1165 | 4154 | 6211 | 9624 | 2063 | 6736 | 33,318 | 92,426 |
| Transport in the simple pipes (dilute/dense) | dense | dense | dense | dilute | dense | dense | dilute | dilute |
| Height of the slug of powder in the simple pipes (in the absence of dilute phase) (m) | 3.94 | 6.75 | 8.57 | NA | 0.79 | 1.35 | NA | NA |
| Mass of the slug of powder in the simple pipes (in the absence of dilute phase) (kg) | 10.4 | 16.5 | 20.2 | NA | 9.7 | 15.9 | NA | NA |
| density in the simple pipes (in the dilute phase) (kg/m$^3$) | NA | NA | NA | 380 | NA | NA | 121 | 210 |
| Residence time of the powders in the simple pipes (sec.) | 32 | 14 | 12 | 9 | 17 | 9 | 3 | 2 |
| Velocity of the particles between the cyclones and the reactor (m/s) | 0.3 | 1.2 | 1.7 | 2.7 | 0.6 | 1.9 | 9.3 | 25.7 |
| Risk of agglomeration in the event of polymerization (high/moderate/low) | high | high | moderate | low | high | moderate | low | low |

Note:
NA = Not Applicable

These results clearly show the advantage in the prior art of having a disengagement region above the cylindrical section of the reactor. The removal of the disengagement region would result in a fluidization velocity insufficient to allow good agitation of the solid particles in the fluidized bed.

EXAMPLES C9, C10, C11, 12, C13, C14, 15 AND 16

This series of examples is based on the same calculations of entrainment and the same type of powder as for the preceding series of examples.

The results presented in Table 4 make it possible to characterize two types of transport of the fine solid particles in the simple pipes connecting the cyclones to the reactor. For a minimum entrainment throughput (of between 6736 and 9624 kg/hr), the flow of the fine solid particles is a dilute-phase transport.

The velocities of the solid particles in the simple pipes between the cyclones and the reactor are, in the majority of cases (except for Example 16), lower than those induced by a device using an ejector/compressor, such as those presented in Table 3 for the preceding series of examples. In the case of Example 16, it would be possible and advantageous to increase the diameter of the simple pipes.

EXAMPLES 17, 18, 19 AND 20

This series of examples is based on the same calculations of entrainment and the same type of powder as for the preceding series of examples.

The device under consideration corresponds to the same industrial device for the manufacture of polyethylene as for the preceding series of examples, with the exception of the cyclones, which have new dimensions presented in the CYC2 column in Table 1.

In this series of examples, the dimensions of the cyclone are changed in order to obtain a dilute-phase flow for fluidization velocities which are lower than in the preceding series of examples.

TABLE 5

|  | 17 | 18 | 19 | 20 |
|---|---|---|---|---|
| Disengagement region (with/without) | without | without | without | without |
| Fluidization velocity (m/sec) | 0.4 | 0.6 | 0.8 | 1 |
| TDH theoretically required (m) | 7.41 | 8.46 | 9.72 | 11.15 |
| % of the fluidized bed entrained (% by mass) | 53 | 85 | >85 | >85 |
| Mean diameter of the entrained particles ($\mu$m) | 139 | 258 | 380 | 535 |
| Apparent density of the fluidized bed (kg/m$^3$) | 362 | 335 | 311 | 290 |
| dP gas across the cyclones (MPa) | 8.1 | 18 | 31.8 | 49.6 |
| dP gas + solid across the cyclones (MPa) | 4.4 | 8.3 | 13.7 | 20.7 |
| Gas throughput across the cyclones (m$^3$/sec) | 236 | 353 | 471 | 589 |
| Powder throughput in the simple pipes (kg/hr) | 6735 | 33,318 | 92,426 | 209,435 |
| Transport in the simple pipes (dilute/dense) | dilute | dilute | dilute | dilute |
| density in the simple pipes (in the dilute phase) (kg/m$^3$) | 55 | 104 | 171 | 259 |
| Residence time in the simple pipes (sec.) | 7.6 | 2.9 | 1.7 | 1.2 |
| Velocity of the particles between the cyclones and the reactor (m/s) | 1.9 | 9.3 | 25.7 | 58.2 |
| Risk of agglomeration in the event of polymerization (high/moderate/low) | low | low | low | low |

The results presented in Table 5 make it possible to characterize a flow of the dilute-phase transport of fine solid particles from a fluidization velocity equal to 0.4 m/s.

In the case of Examples 19 and 20, it would be possible and advantageous to increase the diameter of the simple pipes.

It is commonplace to use cyclones with a high gas velocity at the inlet and a low gas velocity at the outlet. In the series of examples from 1 to 16, the velocity at the inlet varied between 20 and 30 m/sec and the velocity at the outlet varied between 10 and 15 m/sec. In this case, most of the pressure drop in the cyclone was at the inlet of the latter. Consequently, in order to obtain a balance of the pressures in the simple pipe, the length of the said pipe had to be in keeping with this high pressure drop at the inlet of the cyclone. For this reason, the transition from a dense-phase flow to a dilute-phase flow was more difficult.

In the series of examples from 17 to 20, cyclones were chosen with dimensions which make it possible to obtain a velocity at the inlet of the said cyclones of 8 to 14 m/sec and with a higher velocity at the outlet, in order to maintain the overall efficiency of the said cyclone. For this reason, most of the pressure drop in the cyclone was at the outlet of the said cyclone, thus reducing the impact of the pressure drop on the balance of the pressures in the simple pipe, consequently making it possible to reduce the length of the simple pipe and at the same time promoting the change from a dense-phase flow to a dilute-phase flow, without suffering a loss in cyclone efficiency.

EXAMPLES C21, 22 AND 23

These examples are based on tests carried out on a polyethylene powder using an experimental device under operating conditions close to the polymerization conditions.

The device used comprised:
- a cylindrical fluidized-bed reactor with a diameter equal to 30 cm and a height equal to 1 m which is equipped at its base with a distribution grid,
- a cyclone, the dimensions of which are given in the CYC3 column in Table 1, at a height equal to 5 m above the reactor and with an inlet which is connected to the reactor top via a pipe with a diameter equal to 0.01 m,
- a cylindrical pipe connecting the base of the cyclone to the reactor with an internal diameter equal to 0.05 m, the said pipe emerging at a height equal to
- 0.9 m with respect to the distribution grid of the fluidized-bed reactor.

The characteristics of the polyethylene powder used are given in the PE2 column in Table 2.

The density of the particles was measured by mercury porosimetry according to British Standard BS7591 (Porosity and Pore Size Distribution of Materials and Method of Evaluation by Mercury Porosimetry) using the "Micromeritics Autopore III 9420®" device. The analysis was carried out in a pressure range from 0.0034 to 408 MPa absolute. For the calculations, it was considered that the surface tension of the mercury was 485 dyne/cm and that the contact angle was 130°. The 0.8 gram samples were dried before analysis at 60° C. in a vacuum oven.

The density of the polymer (helium skeleton density) was measured using the "Micrometrics AccuPyc 1330 Pycnometer®" device. The samples were dried before analysis in a vacuum oven at 60° C.

The shape factor was determined by optical imaging. The device used is a "Noram Voyager Feature Sizer, Model TN-98-606H3/54S®" with a specific resolution of 154.

The particle diameters were measured with the "Malvern Series 2600C Particle Sizer®" device manufactured by Malvern Instruments.

The operating conditions for various values of fluidization velocity are presented in Table 6.

TABLE 6

|  | C21 | 22 | 23 |
|---|---|---|---|
| Pressure in the reactor (MPa) | 2.2 | 2.2 | 2.2 |
| Temperature in the reactor (° C.) | 60 | 63 | 65 |
| Fluidization velocity (m/s) | 0.45 | 0.62 | 0.78 |
| ADf (kg/m$^3$) | 250 | 233.3 | 133 |
| AD (kg/m$^3$) | 277 | 254.2 | 162.5 |
| Differential pressure of the cyclone (MPa) | 0.0012 | 0.0023 | 0.0049 |
| Residence time in the pipe (seconds) | 79.5 | 28.5 | 7.4 |
| Height of the slug of powder (in the absence of dilute phase) (m) | 0.9 | NA | NA |
| Type of transport (dilute/dense) | dense | dilute | dilute |

Note:
NA = Not Applicable

The results presented in Table 6 make it possible to characterize two types of transport of the fine solid particles in the simple pipe connecting the cyclone to the reactor. For a fluidization velocity of 0.45 m/sec, the entrainment of fine solid particles was insufficient to produce a dilute-phase transport. For fluidization velocities of 0.62 and 0.78 m/s, the transport of the fine particles between the cyclone and the fluidized bed was a dilute-phase flow with lower residence times.

What is claimed is:

1. A process for the continuous gas-phase (co) polymerization of one or more olefins comprising continuously (co)polymerizing one or more olefins in the gas-phase in a fluidized bed, polymerization reactor in which a rising stream of a gas mixture, containing at least one olefin to be (co)polymerized, maintains polymer particles in the course of formation in the fluidized state in the polymerization reactor, the stream entraining fine particles above the fluidized bed, substantially separating the fine particles in the stream from the gas mixture in a separator, dividing the stream into (i) one or more gas streams (A) substantially devoid of the particles which is cooled and reintroduced below and/or into a bottom part of the fluidized bed, and (ii) one or more gas streams (B) containing at least a portion of the particles which is introduced into or above the fluidized bed, wherein at least one of the gas streams (B) containing the particles is introduced directly into the fluidized bed by a dilute-phase transport in a pipe without using any equipment for setting in motion the at least one of the gas streams (B) containing the particles in the pipe.

2. The process according to claim 1, wherein the one or more olefins is (a) ethylene, (b) propylene, (c) a mixture of ethylene and propylene, or one or more other alpha-olefins in combination with (a), (b) or (c).

3. The process according to claim 1 or 2, wherein the polymerization reactor is maintained at a temperature below the melting point of the (co)polymer and at a value of between 30 and 130° C.

4. The process according to claim 1 or 2, wherein the polymerization reactor is maintained at a pressure of between 0.1 and 5 MPa.

5. The process according to claim 1 or 2, wherein the fluidization velocity of the gas mixture is between 0.2 and 1 m/s.

6. The process according to claim 1 or 2, wherein the at least one gas stream (B) is introduced into the fluidized bed at a height above a distribution grid for the fluidized bed of between 20 cm and H/2, where H is the height of the fluidized bed.

7. The process according to claim 1 or 2, wherein the stream is separated in two cyclones connected in series, the first cyclone making a rough separation of the fine particles and the second making a more refined separation, a first fraction of fine particles generated by the first cyclone constituting the at least one gas stream (B) introduced directly into the fluidized bed by a dilute-phase transport in the pipe, and a second fraction of fine particles generated by the second cyclone constituting a second gas stream (B) introduced into the polymerization reactor by any appropriate means.

8. The process according to claim 3, wherein the temperature is between 50 and 120° C.

9. The process according to claim 8, wherein the temperature is between 60 and 110° C.

10. The process according to claim 4, wherein the pressure is between 0.5 and 4 MPa.

11. The process according to claim 10, wherein the pressure is between 1 and 3 MPa.

12. The process according to claim 5, wherein the fluidization velocity is between 0.4 and 0.9 m/s.

13. The process according to claim 12, wherein the fluidization velocity is between 0.6 and 0.8 m/s.

14. The process according to claim 6, wherein the height is between 40 cm and H/4.

15. A device for gas-phase polymerization, comprising:

(i) a fluidized-bed polymerization reactor having a cylindrical cross section and a distribution grid, (ii) at least one separator of particles connected to an upper part of the polymerization reactor, (iii) a loop for recycling a gas of a gas mixture formed in the polymerization reactor to the base of the reactor, this loop containing the at least one separator for separating particles from the gas mixture, a heat exchanger and a gas compressor, and (iv) at least one means for introducing a stream containing particles separated in the at least one separator from the gas mixture into the fluidized bed of the polymerization reactor, wherein the means for introducing the particles into the polymerization reactor is a pipe that ends inside the polymerization reactor in the fluidized beds, said pipe being devoid of any equipment for setting in motion the stream in the pipe.

16. The device according to claim 15, wherein the polymerization reactor does not have a disengagement region.

17. The device according to claim 16, wherein the polymerization reactor is essentially cylindrical.

* * * * *